(12) United States Patent
Rivkin et al.

(10) Patent No.: US 10,867,627 B1
(45) Date of Patent: Dec. 15, 2020

(54) AMPLIFYING STRUCTURE FOR MICROWAVE-ASSISTED MAGNETIC RECORDING

(71) Applicant: Seagate Technology LLC, Cupertino, CA (US)

(72) Inventors: Kirill Aleksandrovich Rivkin, San Jose, CA (US); Javier Ignacio Guzman, Minneapolis, MN (US); Mourad Benakli, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/598,444

(22) Filed: Oct. 10, 2019

Related U.S. Application Data

(60) Provisional application No. 62/745,647, filed on Oct. 15, 2018.

(51) Int. Cl.
  *G11B 5/31* (2006.01)
  *G11B 5/39* (2006.01)
  *G11B 5/23* (2006.01)
  *G11B 5/00* (2006.01)

(52) U.S. Cl.
  CPC .............. *G11B 5/3912* (2013.01); *G11B 5/23* (2013.01); *G11B 5/3116* (2013.01); *G11B 5/3133* (2013.01); *G11B 5/3143* (2013.01); *G11B 2005/0024* (2013.01)

(58) Field of Classification Search
  CPC .......................... G11B 5/3133; G11B 5/3143
  USPC ....................................... 360/125.3
  See application file for complete search history.

(56) References Cited

U.S. PATENT DOCUMENTS

| | | |
|---|---|---|
| 7,464,458 B2 | 12/2008 | Le et al. |
| 8,995,088 B1* | 3/2015 | Boone ................ G11B 5/3146 360/125.32 |
| 9,747,932 B1* | 8/2017 | Taguchi ................ G11B 5/235 |
| 9,754,611 B1 | 9/2017 | Liu et al. |
| 1,036,671 A1 | 7/2019 | Olson et al. |
| 10,559,318 B1* | 2/2020 | Chen ....................... G11B 5/11 |
| 10,699,731 B1* | 6/2020 | Wu ...................... G11B 5/4826 |
| 2014/0063658 A1* | 3/2014 | Shimizu ............... G11B 5/314 360/234.5 |
| 2014/0168812 A1* | 6/2014 | Braganca ........... G01R 33/1284 360/75 |

(Continued)

*Primary Examiner* — Jefferson A Evans
(74) *Attorney, Agent, or Firm* — Mueting Raasch Group

(57) ABSTRACT

An apparatus comprises a microwave-assisted magnetic recording slider body. The body includes a write pole, a trailing shield, a spin torque oscillator, and an amplifying structure. The write pole extends from the air bearing surface into the slider body for a first distance, and the trailing shield extends from the air bearing surface into the slider body for a second distance. The spin torque oscillator is disposed proximate and between the write pole and the trailing shield at the air bearing surface and extends into the slider body for a third distance that is less than the first and second distances. The amplifying structure comprises a stepped portion and a gap, is recessed from the air bearing surface and disposed proximate the spin torque oscillator. The gap has a first interface with the write pole and a second interface with the trailing shield, wherein at least one of the first and second interfaces forms the stepped portion.

20 Claims, 3 Drawing Sheets

(56) References Cited

U.S. PATENT DOCUMENTS

| | | | |
|---|---|---|---|
| 2015/0103434 A1* | 4/2015 | Etoh | G11B 5/314 |
| | | | 360/75 |
| 2017/0047084 A1* | 2/2017 | Funayama | G11B 5/112 |
| 2020/0152228 A1* | 5/2020 | Tang | G11B 5/147 |

* cited by examiner

AMPLIFYING STRUCTURE FOR MICROWAVE-ASSISTED MAGNETIC RECORDING

RELATED PATENT DOCUMENTS

This application claims the benefit of Provisional Patent Application No. 62/745,647 filed on Oct. 15, 2018, which is incorporated herein by reference in its entirety.

SUMMARY

Embodiments of the disclosure are directed to an apparatus comprising a microwave-assisted magnetic recording slider body. The body includes a write pole, a trailing shield, a spin torque oscillator, and an amplifying structure. The write pole extends from the air bearing surface into the slider body for a first distance, and the trailing shield extends from the air bearing surface into the slider body for a second distance. The spin torque oscillator is disposed proximate and between the write pole and the trailing shield at the air bearing surface and extends into the slider body for a third distance that is less than the first and second distances. The amplifying structure comprises a stepped portion and a gap, is recessed from the air bearing surface and disposed proximate the spin torque oscillator. The gap has a first interface with the write pole and a second interface with the trailing shield, wherein at least one of the first and second interfaces forms the stepped portion.

Further embodiments are directed to a magnetic recording head comprising a write pole, a trailing shield, a spin torque oscillator, and an amplifying structure. The write pole extends from an air bearing surface of the recording head and into the recording head for a first distance, and the trailing shield extends from the air bearing surface and into the recording head for a second distance. The spin torque oscillator is disposed proximate and between the write pole and the trailing shield at the air bearing surface and extends into the recording head for a third distance. The third distance is less than the first and second distances. The amplifying structure comprises a magnetic notch and a non-magnetic portion and is recessed from the air bearing surface. The structure has a first region comprising the magnetic notch and a first part of the non-magnetic portion proximate an internal surface of the spin torque oscillator and a second region comprising a second part of the non-magnetic portion distal the internal surface of the spin torque oscillator. The second part has a length in the down-track direction larger than a length of the first part.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

The present disclosure is generally related to microwave-assisted magnetic recording (MAMR). A MAMR read/write element, sometimes referred to as a slider, recording head, read head, write head, read/write head, etc., includes magnetic read and write transducers similar to those on current hard disk drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as the media moves underneath the write pole in response to an energizing current applied to the write coil.

More specifically, in MAMR systems, a spin-torque oscillator (STO) comprising a field-generation layer (FGL) and spin-polarization layer (SPL) is placed within the write gap, i.e., between the write pole and a trailing shield. The write head generates a write field, that beneath the main pole, is substantially perpendicular to the magnetic recording layer of the recording medium. The STO generates a high-frequency auxiliary magnetic field in a microwave band to the recording layer where the auxiliary field has a frequency close to the resonance frequency of the magnetic grains in the recording layer. This excites precession of medium magnetization for magnetic recording on a perpendicular magnetic recording medium having large magnetic anisotropy; thus reducing the switching magnetic field of the magnetic grains. As a result, the oscillating field of the STO's FGL resonates with the recording medium to stably write data using a narrower writer as compared with those of conventional PMR heads.

The STO generates the radio frequency (RF) field, which assists the magnetization reversal and contributes to both down-track and cross-track gradients of the effective magnetic field. However, the down-track size of the STO, which is located in the gap between the write pole and the trailing shield, can be considerable. For example, the down-track size can exceed the dimensions of existing write head gap sizes adopted by the industry (e.g., about 17-23 nm). Therefore, the gradient of magnetic field generated by the write pole and the trailing shield can be lower than in conventional recording. This negatively impacts the overall performance of the write head. Embodiments described herein are directed to an amplifying structure located recessed from the air bearing surface and within the write head that can be used to increase the magnitude of the effective field gradient underneath the STO. For example, the amplifying structure increases the magnetic field gradient to compensate for, overcome, or improve on any decrease in the magnetic field gradient due to the size of the STO.

Figure 1:
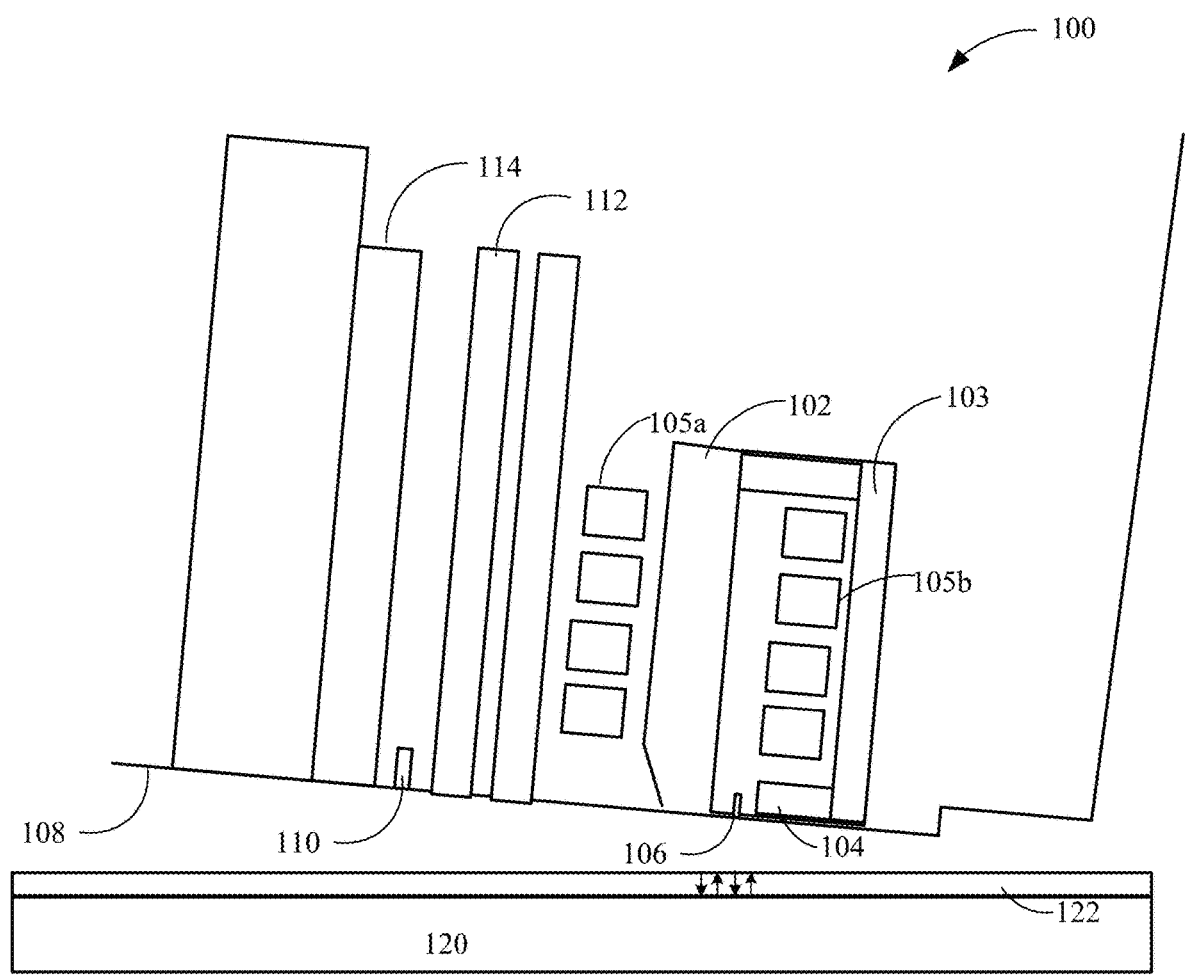
FIG. 1 is a cross-sectional view of a microwave-assisted magnetic recording slider assembly according to embodiments discussed herein.

With reference to FIG. 1, a cross-section of a MAMR slider body 100 is shown according to a representative embodiment. The slider body 100 is shown proximate a writeable medium 120 (e.g., a magnetic recording disk). The recording medium 120 includes a magnetic recording layer 122, which is comprised of various perpendicular magnetic grains that can change (i.e., flip) their respective directions of magnetization and are illustrated by arrows of differing directions. When the magnetic field generated by the slider body 100 is strong enough to flip the magnetization of one or more magnetic grains, bits of information may then be recorded in the form of a perpendicular upward/downward magnetization direction for a series of magnetic domains in the layer 122. The bits can also be used to erase information. While the slider body 100 includes various components of a magnetic recording head, the relevant components are labeled for discussion.

The slider body surface facing the surface of the magnetic recording medium 120 is referred to as the media-facing surface 108. The media-facing surface 108 faces, and is held proximate to, the moving medium surface while reading and writing to the medium 120. The media-facing surface 108 may be configured as an air-bearing surface (ABS) that maintains separation from the medium surface via a thin layer of air. Positioned at the air bearing surface 108 is a reader 110. The reader 110 includes a read element (e.g., a GMR sensor) disposed between a pair of reader shields 112, 114. A reader heater (not shown) is located proximate the reader 110, which is configured to thermally actuate the reader 110 during read operations.

Also positioned at the air bearing surface 108 are the writer components. The writer includes a write coil, which includes a lower coil 105a and an upper coil 105b, proximate a return pole 103. The write coil may conform to any writer coil design, including a double-pancake design, single-layer pancake design, or a helical coil design, for example. The write coil is configured to energize a write pole 102. A writer heater (not shown) is positioned proximate the write pole 102 and is configured to thermally actuate the write pole 102 during write operations. The writer also includes a STO 106 and a trailing shield 104. While the STO 106 is shown for illustration purposes within a gap between the write pole 102 and the trailing shield 104, the size of the STO in practice can place the STO adjacent one or more of the write pole 102 and trailing shield 104 as further shown below.

Figure 2A:
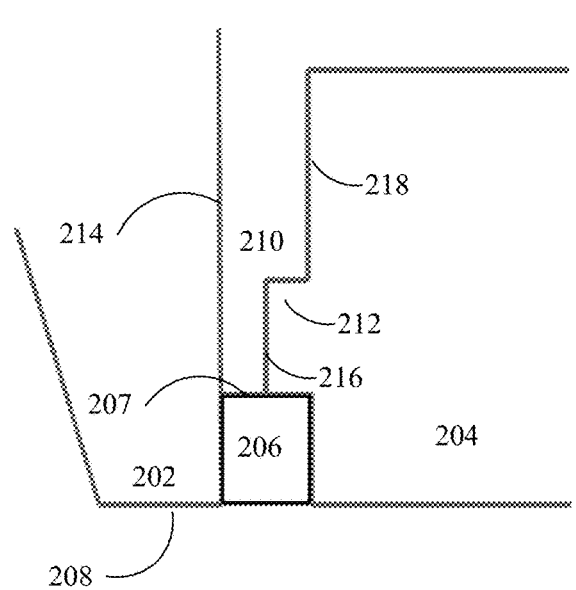
FIGS. 2A-C are cross-sectional views of a writer including amplifying structures according to embodiments discussed herein.
Figure 2B:
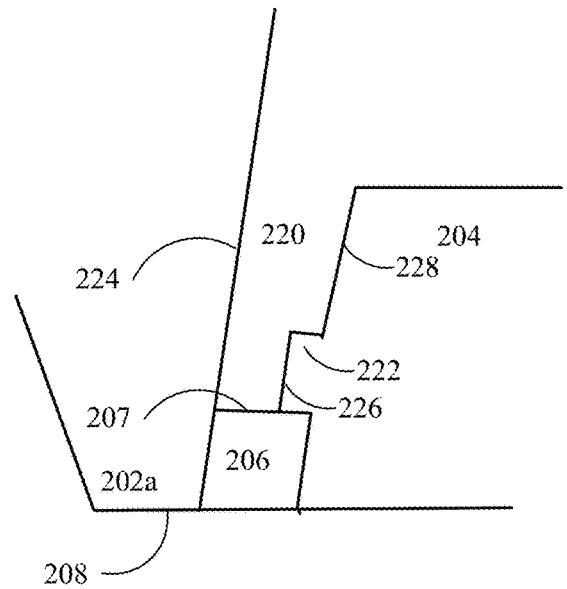
Figure 2C:
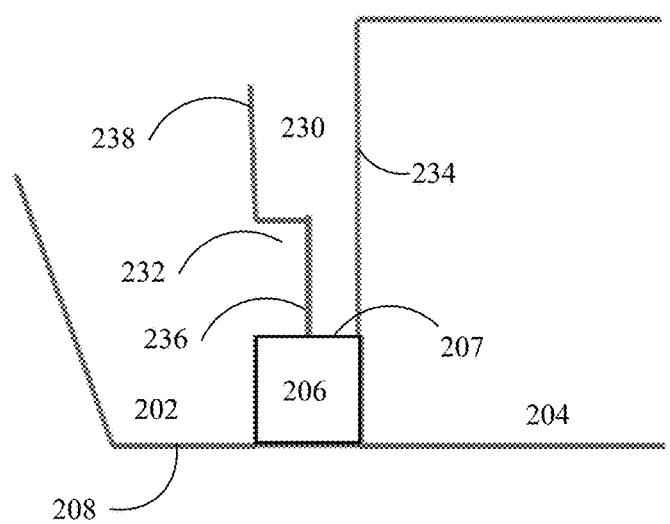

FIGS. 2A-C illustrate cross-sectional views of an amplifying structure according to various embodiments. In each of FIGS. 2A-C, a STO 206 is shown at the air bearing surface 208 between and adjacent both the write pole 202 and the trailing shield 204. An amplifying structure is shown recessed from the air bearing surface 208 and above (i.e., within the slider body) the STO 206.

In FIG. 2A, the amplifying structure comprises a stepped portion 212 and a gap 210. The gap has a first interface 214 with the write pole 202 and a second interface with the trailing shield 204. More specifically, the gap's second interface has a first portion 216 between the gap 210 and the stepped portion 212 and a second portion 218 between the gap 210 and the trailing shield 204. The first interface 214 is planar, substantially perpendicular to the air bearing surface 208, and is aligned with the interface between the STO 206 and the write pole 202. The gap 210 also has an interface with an internal surface 207 of the STO 206, which is a surface of the STO 206 that is internal, or inside, the slider body. At the STO internal surface 207, the gap 210 is narrower in the down-track direction than further away from the STO internal surface 207 (i.e., distal the STO, or at a position in the recording head recessed further from the air bearing surface 208). This change in gap 210 length in the down-track direction outlines the stepped portion 212, or a magnetic notch. While some stepped configurations are used in other perpendicular magnetic recording configurations, they are located at the air bearing surface and would conflict with the presence of the STO at the air bearing surface in MAMR.

Here, the stepped portion 212 is part of the trailing shield 204 and is comprised of the same materials as the trailing shield. However, in certain embodiments, the stepped portion 212 may comprise one or more different materials from those of the trailing shield. Example magnetic materials for the stepped portion 212 include those having high magnetization saturation (e.g., about 1.0-2.4 T, or in certain embodiments, about 1.8-2.4 T), such as NiFe, CoNiFe, and CoFe. In certain embodiments, the gap 210 is filled with non-magnetic materials, which may include one or more of dielectrics, such as alumina, and non-magnetic metals, such as ruthenium. The change in down-track lengths for the gap 210 is shown as an abrupt change, i.e., a step, forming a surface substantially parallel to the air bearing surface; however, the change could occur more gradually at any variety of slopes/angles.

The dimensions of the stepped portion 212 can be varied to tune the magnitude of the effective field gradient underneath the STO 206. For example, while the stepped portion 212 is shown as covering about half of the STO internal surface 207, this dimension can be varied as a function of preferred performance parameters. In certain embodiments, the amplifying structure can have the same width (i.e., cross-track dimension, as seen from the ABS) as the STO 206, or the structure can be wider. Also, the height of the stepped portion 212, i.e., the distance the narrowed portion of the gap 210 extends into the recording head, can be varied. In other words, the amount of recession of the step, or notch, from the air bearing surface can be varied. In certain embodiments, the step is located 50-90 nm from the air bearing surface 208, depending on the dimensions of the STO 206. Thus, a height of the narrowed portion of the gap 210 is about 30-50 nm, and in further embodiments about 40 nm, from the top (i.e., internal surface 207) of the STO 206 to the step.

While the second portion of the second interface 218 is shown in alignment with the interface between the STO 206 and the trailing shield 204, such that the larger/longer portion of the gap 210 distal from the STO 206 has a length in the down-track direction substantially equal to the length of the STO 206, this is not required. For example, the down-track distance between first interface 214 and the second portion 218 can be greater than the down-track dimension of the STO 206.

In FIG. 2B, the amplifying structure comprises a stepped portion 222 and a gap 220. The gap has a first interface 224 with a beveled write pole 202a and a second interface with the trailing shield 204. Similar to above, the gap's second interface has a first portion 226 between the gap 220 and the stepped portion 222 and a second portion 228 between the gap 220 and the trailing shield 204. The first interface 224 is planar, angled with respect to the air bearing surface, and is aligned with the interface between the STO 206 and the write pole 202a. The second interface is also angled with respect to the air bearing surface 208 and both the first and second portions 226, 228 are substantially parallel to the angle of the first interface 224 (i.e., the bevel of the write pole 202a). The gap 220 also has an interface with an internal surface 207 of the STO 206. At the STO internal surface 207, the gap 220 is narrower in the down-track direction than further away from the STO internal surface 207 (i.e., distal the STO 206, or at a position in the recording head recessed further from the air bearing surface). This change in gap 220 length in the down-track direction outlines the stepped portion 222, or a magnetic notch.

Here, the stepped portion 222 is part of the trailing shield 204 and is comprised of the same materials as the trailing shield. However, in certain embodiments, the stepped portion 222 may comprise one or more different materials from those of the trailing shield. Example magnetic materials for the stepped portion 212 include those having high magnetization saturation (e.g., about 1.0-2.4 T, or in certain embodiments, about 1.8-2.4 T), such as NiFe, CoNiFe, and CoFe. In certain embodiments, the gap 220 is filled with non-magnetic materials, which may include one or more of dielectrics, such as alumina, and non-magnetic metals, such as ruthenium. The change in down-track lengths for the gap 220 is shown as an abrupt change, i.e., a step, forming a surface substantially parallel to the air bearing surface; however, the change could occur more gradually at any variety of slopes/angles.

The dimensions of the stepped portion 222 can be varied to tune the magnitude of the effective field gradient underneath the STO 206. For example, while the stepped portion 222 is shown as covering about half of the STO internal surface 207, this dimension can be varied as a function of preferred performance parameters. In certain embodiments, the amplifying structure can have the same width (i.e., cross-track dimension, as seen from the ABS) as the STO 206, or the structure can be wider. Also, the height of the stepped portion 222, i.e., the distance the narrowed portion of the gap 220 extends into the recording head, can be varied. In other words, the amount of recession of the step, or notch, from the air bearing surface 208 can be varied. For the sloped embodiment of FIG. 2B, if measuring along a line parallel to the surface of first portion 226 (or the trailing surface of STO 206), the dimensions would be comparable to those of FIG. 2A. For example, the step is located 50-90 nm along the angled interface from the air bearing surface 208, depending on the dimensions of the STO 206. Thus, a height of the narrowed portion of the gap 220 is about 30-50 nm along the angled surface, and in further embodiments about 40 nm, from the top of the STO 206 to the step.

While the second portion of the second interface 228 is shown in alignment with the interface between the STO 206 and the trailing shield 204, such that the larger/longer portion of the gap 220 distal from the STO 206 has a length in the down-track direction substantially equal to the length of the STO 206, this is not required. For example, the down-track distance between first interface 224 and the second portion 228 can be greater than the down-track dimension of the STO 206.

In FIG. 2C, the amplifying structure comprises a stepped portion 232 and a gap 230. The gap 230 has a first interface 234 with the trailing shield 204 and a second interface with the write pole 202. More specifically, the gap's second interface has a first portion 236 between the gap 230 and the stepped portion 232 and a second portion 238 between the gap 230 and the write pole 202. The first interface 234 is planar, substantially perpendicular to the air bearing surface, and is aligned with the interface between the STO 206 and the trailing shield 204. The gap 230 also has an interface with an internal surface 207 of the STO 206. At the STO internal surface 207, the gap 230 is narrower in the down-track direction than further away from the STO internal surface 207 (i.e., distal the STO 206, or at a position in the recording head recessed further from the air bearing surface 208). This change in gap 230 length in the down-track direction outlines the stepped portion 232, or a magnetic notch.

Here, the stepped portion 232 is part of the write pole 202 and is comprised of the same materials as the write pole 202. However, in certain embodiments, the stepped portion 232 may comprise one or more different materials from those of the write pole 202. Example magnetic materials for the stepped portion 232 include those having high magnetization saturation (e.g., about 1.0-2.4 T, or in certain embodiments, about 1.8-2.4 T), such as NiFe, CoNiFe, and CoFe. In certain embodiments, the gap 230 is filled with non-magnetic materials, which may include one or more of dielectrics, such as alumina, and non-magnetic metals, such as ruthenium. The change in down-track lengths for the gap 230 is shown as an abrupt change, i.e., a step or notch, forming a surface substantially parallel to the air bearing surface 208; however, the change could occur more gradually at any variety of slopes/angles.

The dimensions of the stepped portion 232 can be varied to tune the magnitude of the effective field gradient underneath the STO 206. For example, while the stepped portion 232 is shown as covering about half of the STO internal surface 207, this dimension can be varied as a function of preferred performance parameters. In certain embodiments, the amplifying structure can have the same width (i.e., cross-track dimension, as seen from the ABS 208) as the STO 206, or the structure can be wider. Also, the height of the stepped portion 232, i.e., the distance the narrowed portion of the gap 230 extends into the recording head, can be varied. In other words, the amount of recession of the step, or notch, from the air bearing surface can be varied. In certain embodiments, the step is located 50-90 nm from the air bearing surface 208, depending on the dimensions of the STO 206. Thus, a height of the narrowed portion of the gap 210 is about 30-50 nm, and in further embodiments about 40 nm, from the top of the STO 206 to the step.

While the second portion of the second interface 238 is shown in alignment with the interface between the STO 206 and the write pole 202, such that the larger/longer portion of the gap 230 distal from the STO 206 has a length in the down-track direction substantially equal to the length of the STO 206, this is not required. For example, the down-track distance between first interface 234 and the second portion 238 can be greater than the down-track dimension of the STO 206. When the stepped portion is formed in the write pole 202, as shown in FIG. 2C, the increased mass of the write pole 202 provides an additional effect of increased field gradient underneath the STO 206.

The embodiments of each of FIGS. 2A-C are also combinable. For example, the amplifying structure could form stepped portions in the interfaces with both the write pole and the trailing shield. This configuration may be combined with both straight and beveled write poles. In further embodiments, multiple stepped portions may be formed in one, or both, of the write pole and trailing shield. Such stepped portions may mirror each other, or be staggered.

Figure 3:
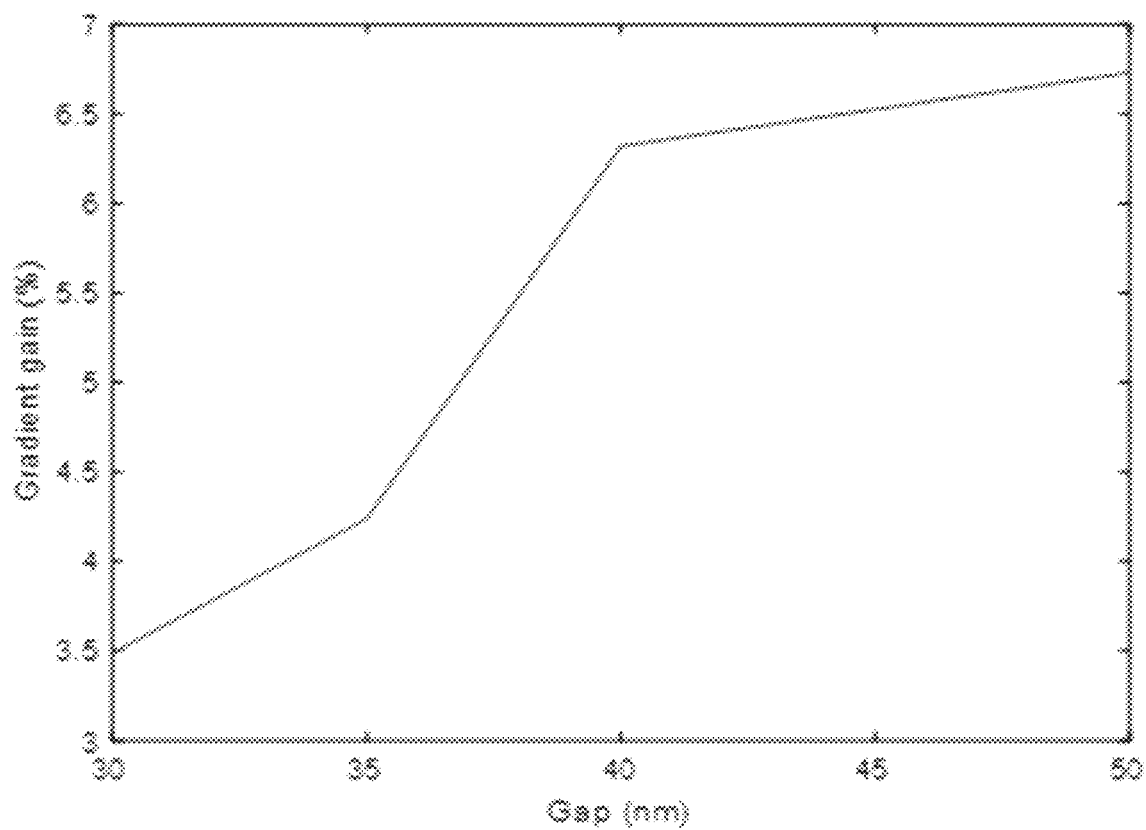
FIG. 3 is a graph illustrating the percentage of magnetic field gradient gain as a function of the write pole-trailing shield gap.

FIG. 3 is a graph illustrating the percentage of magnetic field gradient gain as a function of the down-track write pole-trailing shield gap. More specifically, the graph shows the percentage gain in magnetic field gradient for a recording head having a gap of "x" nm between the write pole and the trailing shield and an amplifying structure, as discussed above, as compared with a recording head having the same sized gap but no amplifying structure. Thus, the down-track write pole—trailing shield gap of the x-access is effectively the down-track dimension of the STO. In the comparison structures, the gap was flat (i.e., not sloped) such that the graph represents modeled results for embodiments in accordance with FIG. 2A above. For each size gap (e.g., 30 nm, 35 nm, 40 nm, etc.), the height and down-track dimension (e.g., thickness) of the stepped portion were varied, and the maximum value of gradient obtained was plotted for the y-axis. Thus, the height and down-track dimensions of the stepped portion for each point plotted may be different. However, the recession of the stepped portion from the air-bearing surface, which is also the vertical dimension of the STO, was held constant at 40 nm for each configuration.

As can be seen, when the gap is 40 nm, or more, there is a significant increase in gradient gain due to the presence of an amplifying structure. Further modeling shows some gradient gain in both straight and sloped (i.e., embodiments in accordance with FIG. 2B) configurations, as described above. Consistent with the above, the gain increases as the STO length in the down-track direction increases.

Inclusion of an amplifying structure, as discussed above, has been shown to provide an increase in magnetic field gradient over recording heads without such a structure. This allows for spin torque oscillators with larger dimensions to be included in a recording head while reducing or eliminating any negative effects on the overall magnetic field gradients. In turn, the ability to tune the magnetic field gradient below the spin torque oscillator provides improved overall writing performance.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. An apparatus, comprising:
a slider body having an air bearing surface and configured for microwave-assisted magnetic recording, the slider comprising:
a write pole extending from the air bearing surface and into the slider body for a first distance;
a trailing shield extending from the air bearing surface and into the slider body for a second distance;
a spin torque oscillator disposed proximate and between the write pole and the trailing shield at the air bearing surface and extending into the slider body for a third distance, where the third distance is less than the first and second distances; and
an amplifying structure comprising a stepped portion and a gap, recessed from the air bearing surface and disposed proximate the spin torque oscillator, wherein the gap has a first interface with the write pole and a second interface with the trailing shield, wherein at least one of the first and second interfaces forms the stepped portion.

2. The apparatus of claim 1, wherein the spin torque oscillator comprises an internal surface substantially parallel to the air bearing surface and recessed from the air bearing surface by the third distance and the stepped portion covers a portion of the internal surface of the spin torque oscillator.

3. The apparatus of claim 2, wherein the trailing shield comprises the stepped portion.

4. The apparatus of claim 3, wherein the second interface comprises a first portion proximate the spin torque oscillator and a second portion distal the spin torque oscillator and the stepped portion includes a surface bridging the two portions that is substantially parallel to the spin torque oscillator internal surface.

5. The apparatus of claim 2, wherein the write pole comprises the stepped portion.

6. The apparatus of claim 5, wherein the first interface comprises a first portion proximate the spin torque oscillator and a second portion distal the spin torque oscillator and the stepped portion includes a surface bridging the two portions that is substantially parallel to the spin torque oscillator internal surface.

7. The apparatus of claim 1, wherein the first interface comprises a first portion proximate the spin torque oscillator and a second portion distal the spin torque oscillator, wherein the down-track distance between the first portion of the first interface and the second interface is smaller than the down-track distance between the second portion of the first interface and the second interface.

8. The apparatus of claim 1, wherein the second interface comprises a first portion proximate the spin torque oscillator and a second portion distal the spin torque oscillator, wherein the down-track distance between the first portion of the second interface and the first interface is smaller than the down-track distance between the second portion of the second interface and the first interface.

9. The apparatus of claim 1, wherein at least one of the first and second interfaces is substantially perpendicular to the air bearing surface.

10. The apparatus of claim 1, wherein at least one of the first and second interfaces is angled with respect to the air bearing surface.

11. The apparatus of claim 1, wherein the spin torque oscillator has a width in the cross-track direction of the slider body and the amplifying structure has width in the cross-track direction equal to or greater than the width of the spin torque oscillator.

12. The apparatus of claim 1, wherein the amplifying structure stepped portion is comprised of at least one material having a magnetic saturation of about 1.0 T to about 2.4 T.

13. A magnetic recording head, comprising:
a write pole extending from an air bearing surface of the recording head and into the recording head for a first distance;
a trailing shield extending from the air bearing surface and into the recording head for a second distance;
a spin torque oscillator disposed proximate and between the write pole and the trailing shield at the air bearing surface and extending into the recording head for a third distance where the third distance is less than the first and second distances; and
an amplifying structure comprising a magnetic notch and a non-magnetic portion, the structure being recessed from the air bearing surface and having a first region comprising the magnetic notch and a first part of the non-magnetic portion proximate an internal surface of the spin torque oscillator and a second region comprising a second part of the non-magnetic portion distal the internal surface of the spin torque oscillator, the second part having a length in the down-track direction larger than a length of the first part.

14. The magnetic recording head of claim 13, wherein the write pole has a planar interface with the spin torque oscillator and the non-magnetic portion.

15. The magnetic recording head of claim 14, wherein the planar interface is substantially perpendicular to the air bearing surface.

16. The magnetic recording head of claim 14, wherein the planar interface extends into the recording head at an angle.

17. The magnetic recording head of claim 13, wherein the trailing shield has a planar interface with the spin torque oscillator and the non-magnetic portion.

18. The magnetic recording head of claim 13, wherein the magnetic notch comprises an internal surface that is distal the spin torque oscillator and substantially parallel to the spin torque oscillator internal surface.

19. The magnetic recording head of claim 13, wherein the magnetic notch is comprised of at least one material having a magnetic saturation of about 1.0 T to about 2.4 T.

20. The magnetic recording head of claim 13, wherein the spin torque oscillator has a width in the cross-track direction of the slider body and the amplifying structure has width in the cross-track direction equal to or greater than the width of the spin torque oscillator.

* * * * *